United States Patent
Kim

(10) Patent No.: US 10,264,872 B2
(45) Date of Patent: Apr. 23, 2019

(54) WEARABLE DEVICE

(71) Applicants: SPHEREDYNE CO., LTD., Seoul (KR); Sug-Whan Kim, Gyeonggi-do (KR)

(72) Inventor: Sug-Whan Kim, Gyeonggi-do (KR)

(73) Assignees: SPHEREDYNE CO., LTD., Seoul (KR); Sug-Whan Kim, Gyeonggi-Do (KR)

( * ) Notice: Subject to any disclaimer, the term of this patent is extended or adjusted under 35 U.S.C. 154(b) by 0 days.

(21) Appl. No.: 15/103,590

(22) PCT Filed: Dec. 11, 2014

(86) PCT No.: PCT/KR2014/012188
§ 371 (c)(1),
(2) Date: Jun. 10, 2016

(87) PCT Pub. No.: WO2015/088260
PCT Pub. Date: Jun. 18, 2015

(65) Prior Publication Data
US 2016/0286945 A1    Oct. 6, 2016

(30) Foreign Application Priority Data

Dec. 11, 2013  (KR) .................. 10-2013-0154115

(51) Int. Cl.
*A45F 5/00*      (2006.01)
*B25F 1/00*      (2006.01)
(Continued)

(52) U.S. Cl.
CPC ............... *A45F 5/00* (2013.01); *B25F 1/003* (2013.01); *B25F 1/04* (2013.01); *F16M 13/02* (2013.01);
(Continued)

(58) Field of Classification Search
CPC ...... A45F 2005/008; A45F 5/00; B25F 1/003; B25F 1/04
(Continued)

(56) References Cited

U.S. PATENT DOCUMENTS 1,315,503 A * 9/1919 Hughes ............... B26B 1/046
                                                            30/159
3,752,524 A * 8/1973 Reick, Jr. ............ B65G 7/12
                                                            294/25
(Continued)

FOREIGN PATENT DOCUMENTS

| KR | 20-0439447 | 4/2008 |
|---|---|---|
| KR | 20-2012-0003992 | 6/2012 |
| KR | 10-1300827 | 8/2013 |

OTHER PUBLICATIONS

Search Report for International Patent Application PCT/KR2014/012188 dated Feb. 2, 2015.
(Continued)

*Primary Examiner* — Derek J Battisti
(74) *Attorney, Agent, or Firm* — K&L Gates LLP

(57) ABSTRACT

A wearable device is disclosed. A wearable device according to an embodiment relates to a mechanism, including: a wearing unit configured to be mounted on any one of a human, an animal, and a mechanical device; a housing configured to be coupled to the wearing unit and to accommodate a tool having a predetermined function; and a power transmission unit configured such that one end thereof is coupled to a part of the wearing unit and the other end thereof comes into contact with the tool, thereby moving in conjunction with movement of the human, animal or mechanical device and transmitting force to the tool; wherein when a part of the human, animal, or mechanical device moves, the tool receives force from the power transmission unit and projects out of the housing, and to the utilization of the mechanism.

18 Claims, 10 Drawing Sheets

(51) Int. Cl.
  *B25F 1/04* (2006.01)
  *F16M 13/02* (2006.01)
  *F16M 13/04* (2006.01)
(52) U.S. Cl.
  CPC ....... *F16M 13/04* (2013.01); *A45F 2005/008* (2013.01); *A45F 2200/0575* (2013.01)
(58) Field of Classification Search
  USPC ............................... 30/151, 298, 162; 2/160
  See application file for complete search history.

(56) References Cited

U.S. PATENT DOCUMENTS 3,981,526 A * 9/1976 Lundqvist .............. A63B 29/08
  294/25
3,999,290 A   12/1976 Wood
4,096,629 A * 6/1978 Levine ...................... B26B 1/00
  30/152
5,058,278 A * 10/1991 Colvin .................... F41B 15/00
  30/289
5,301,432 A * 4/1994 Richardson ........... B26B 27/007
  30/291
5,325,596 A * 7/1994 Baker ................... B26B 27/007
  2/163
5,588,214 A * 12/1996 Nelson .................. B26B 27/007
  30/298
6,892,397 B2   5/2005 Raz et al.
2010/0236077 A1* 9/2010 Shirey ...................... B26B 1/02
  30/152

OTHER PUBLICATIONS

Written Opinion for International Patent Application PCT/KR2014/012188 dated Feb. 2, 2015.

* cited by examiner

[Fig. 1]
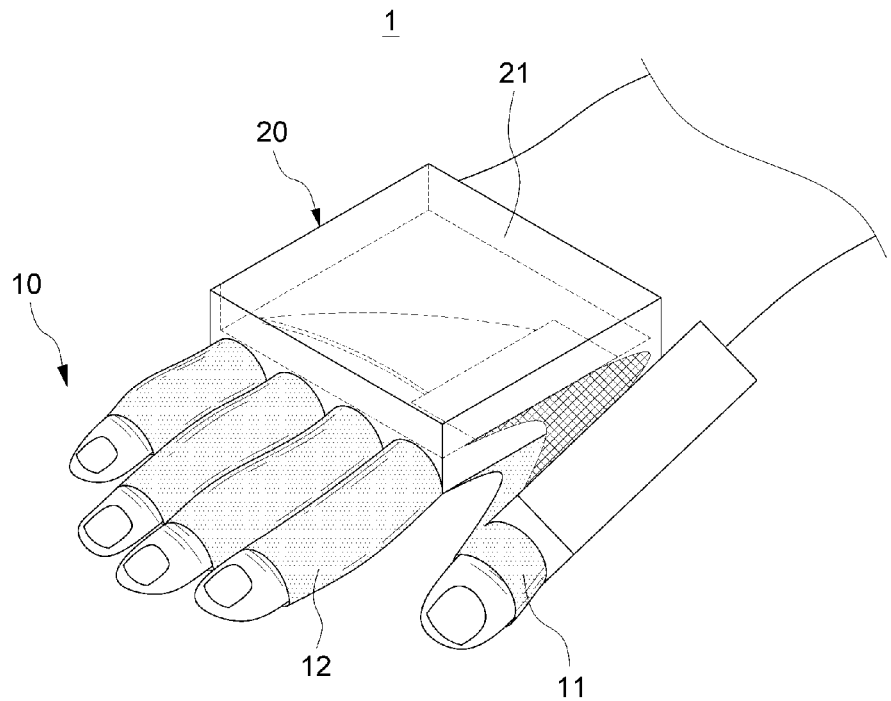
[Fig. 2]
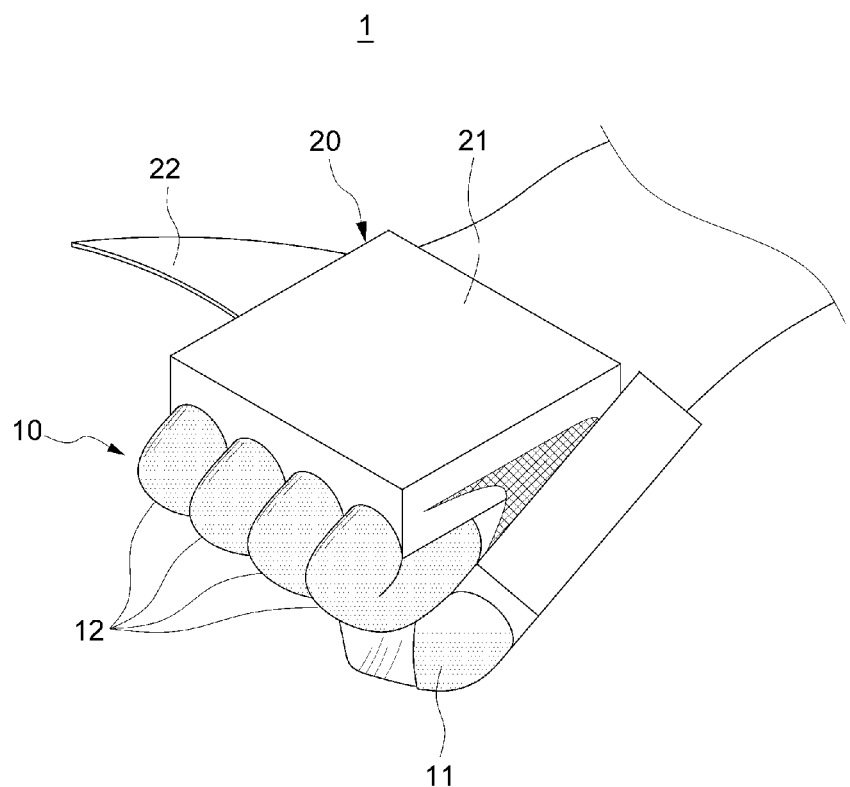

[Fig. 3]
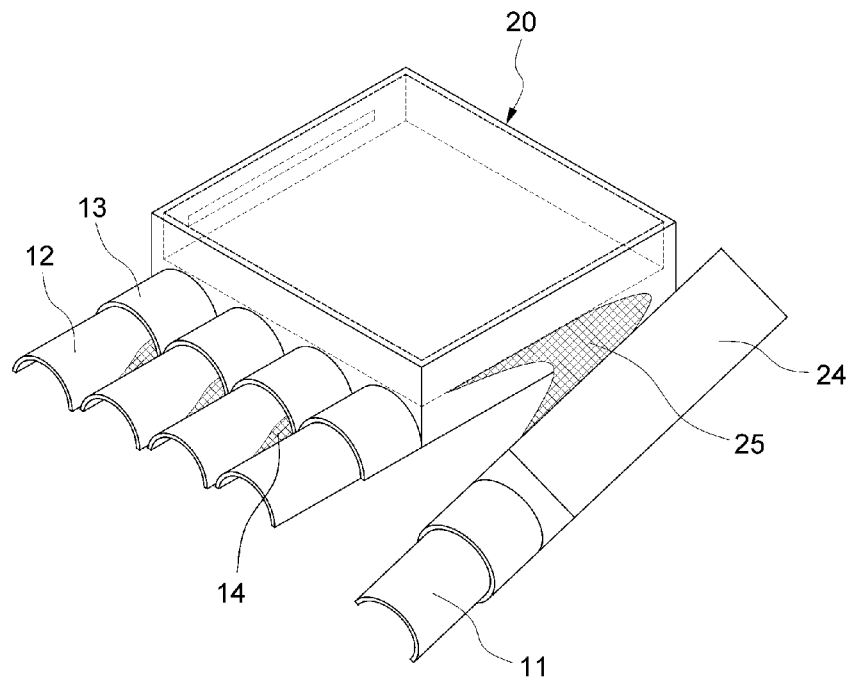
[Fig. 4]
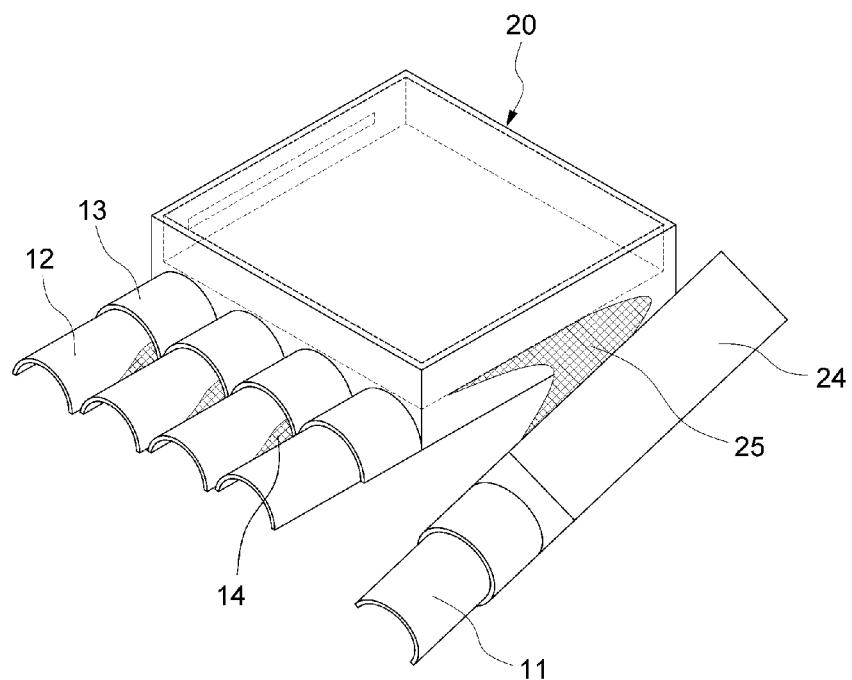

[Fig. 5]
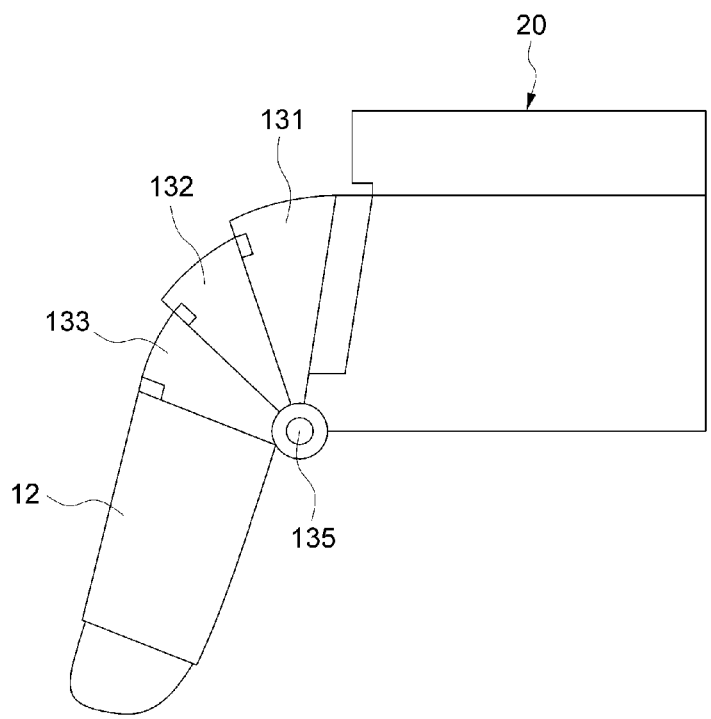
[Fig. 6]
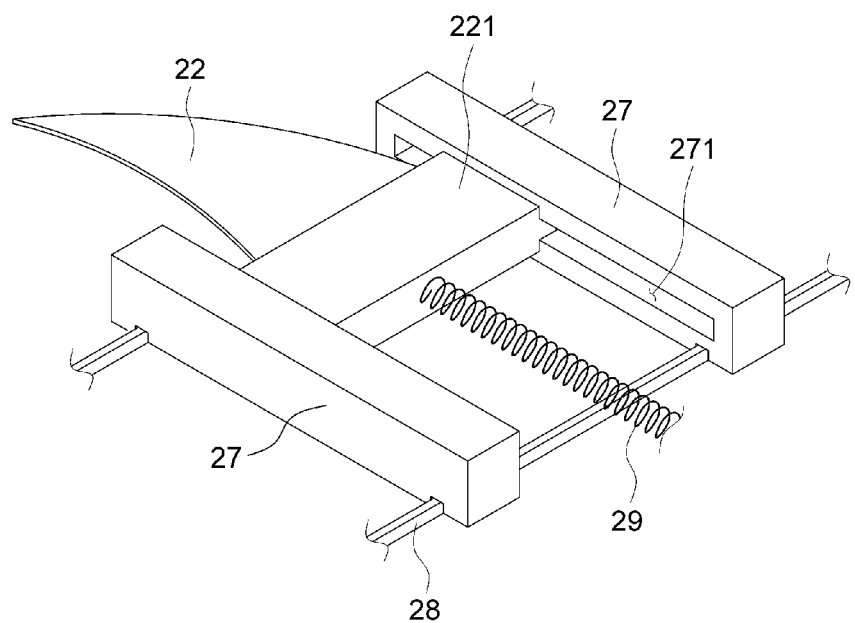

[Fig. 7]
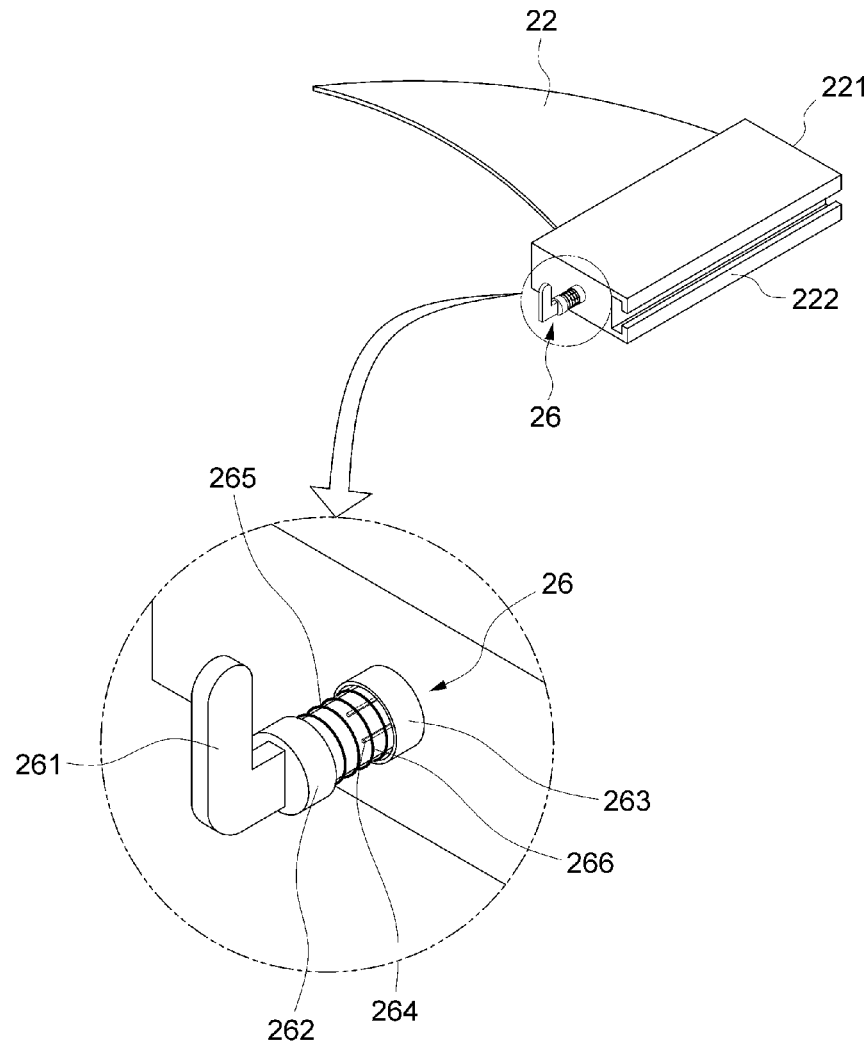
[Fig. 8]
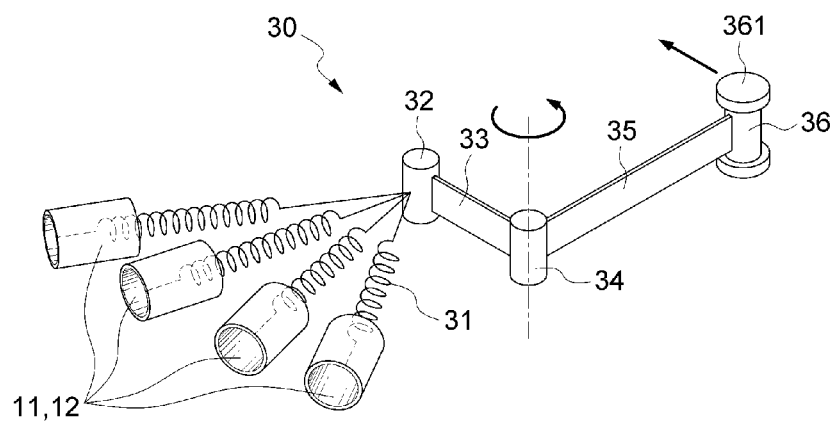

[Fig. 9]
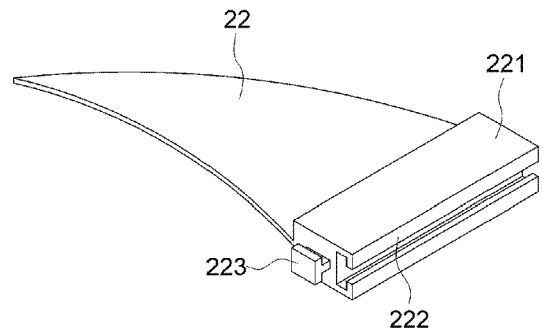
(a)
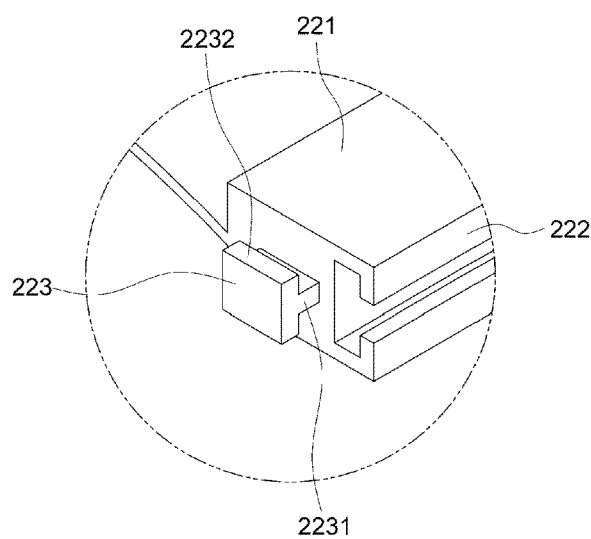
(b)
[Fig. 10]
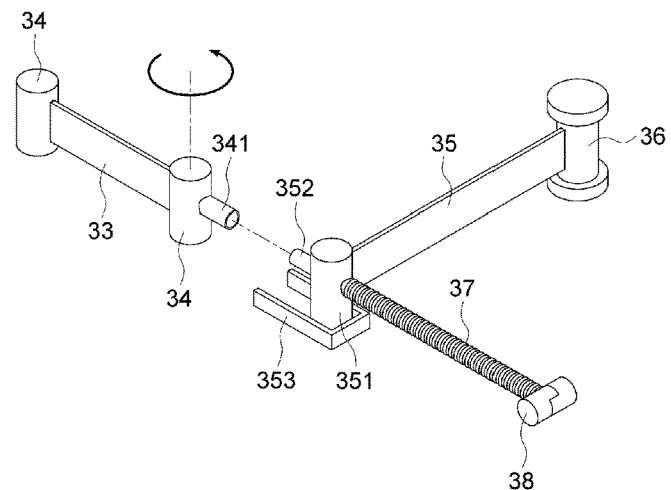

[Fig. 11]
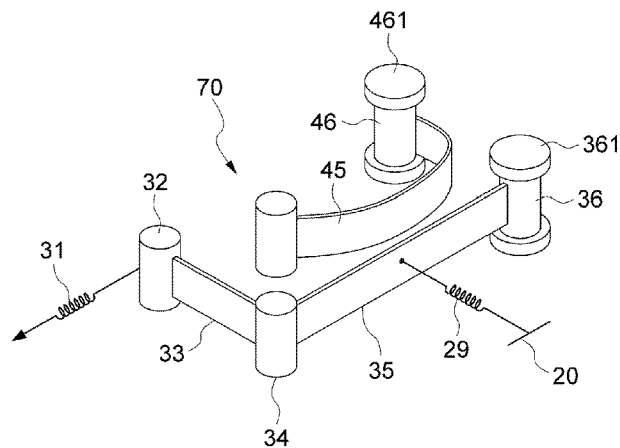
[Fig. 12]
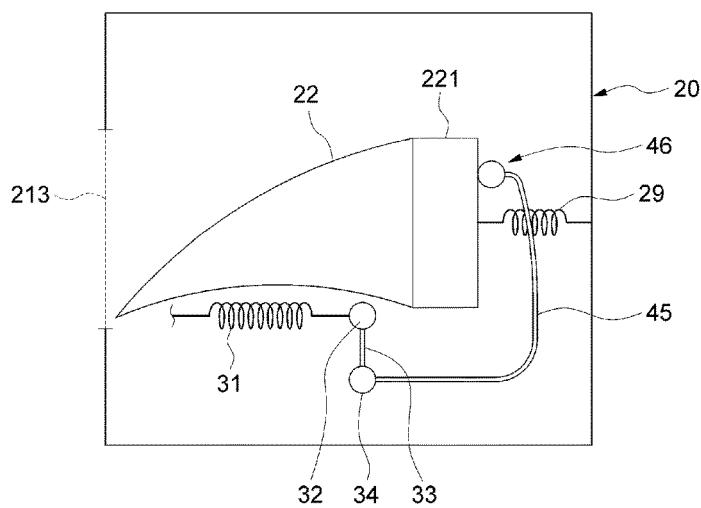
[Fig. 13]
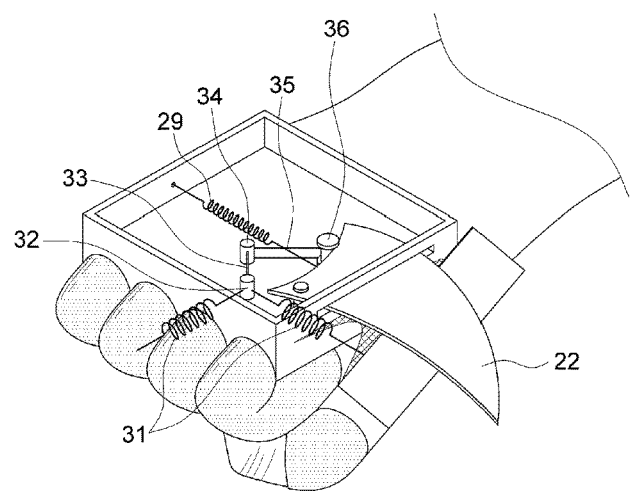

[Fig. 14]
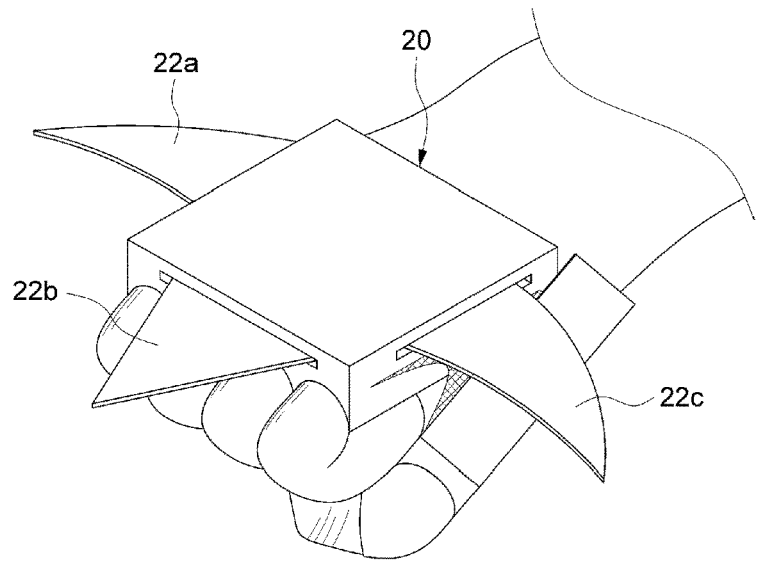
[Fig. 15]
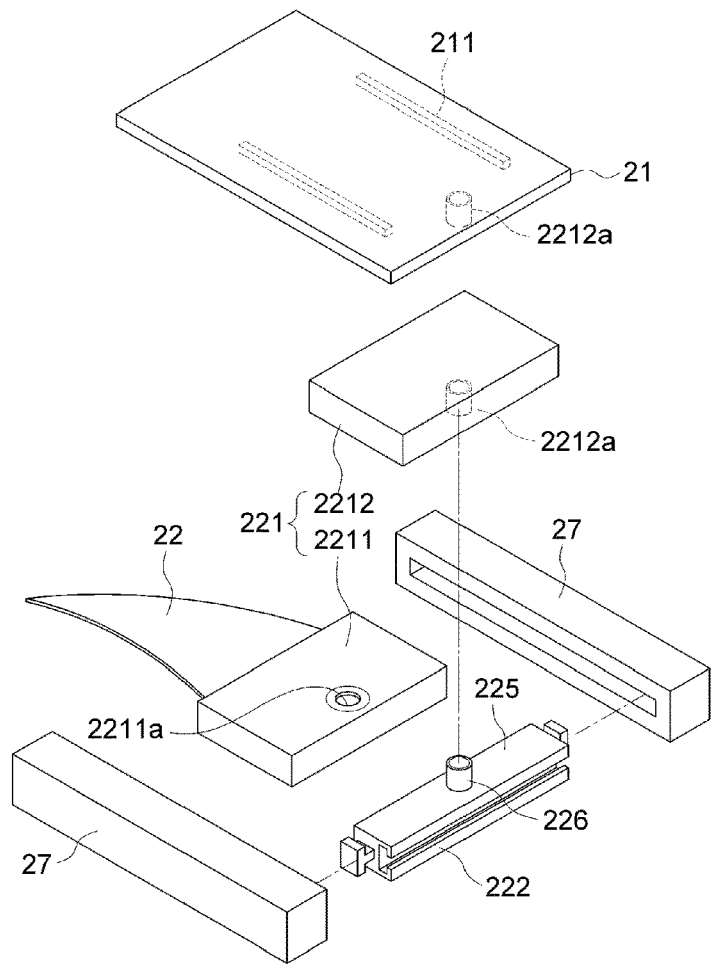

[Fig. 16]
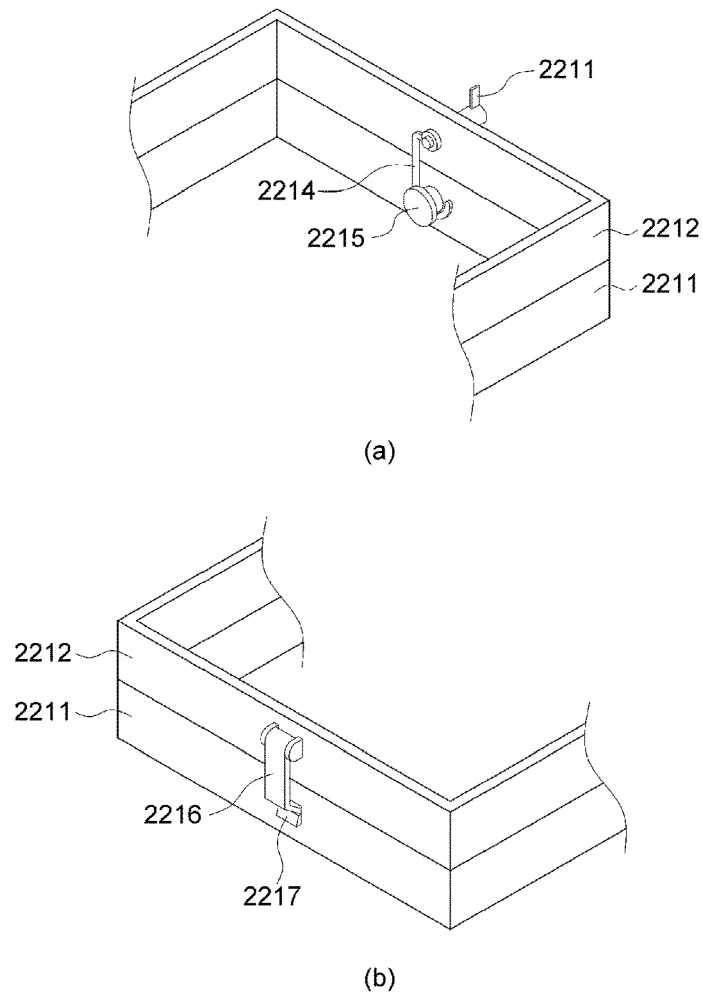
[Fig. 17]
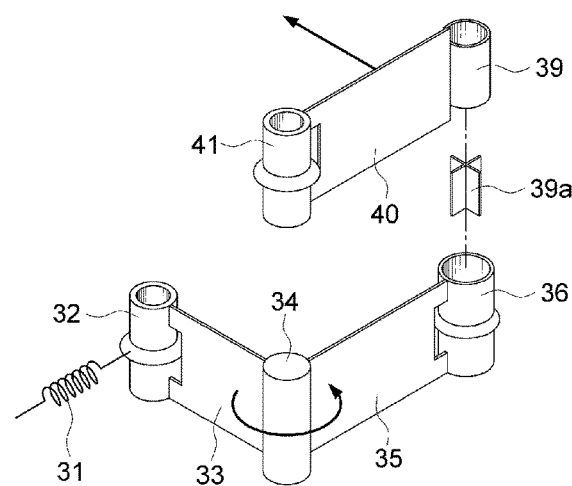

[Fig. 18]
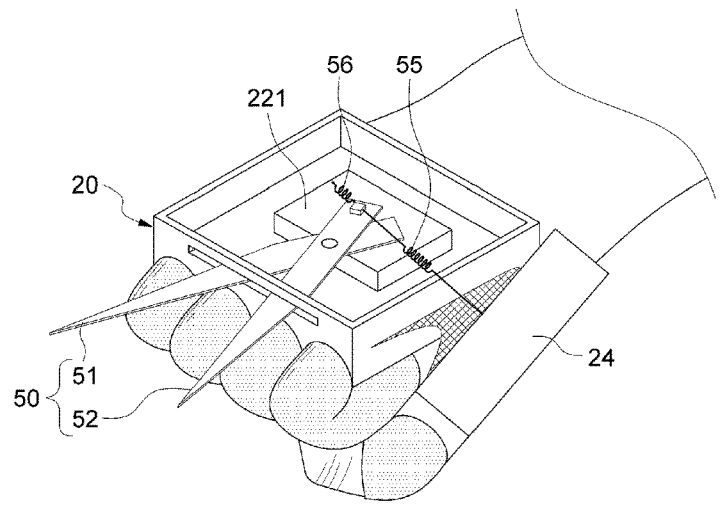
[Fig. 19]
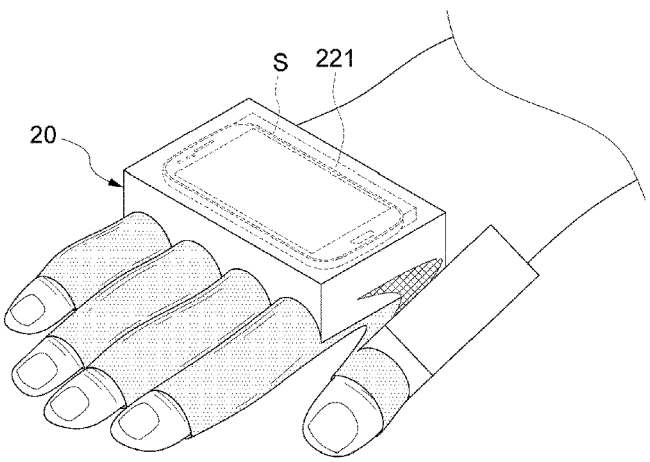
[Fig. 20]
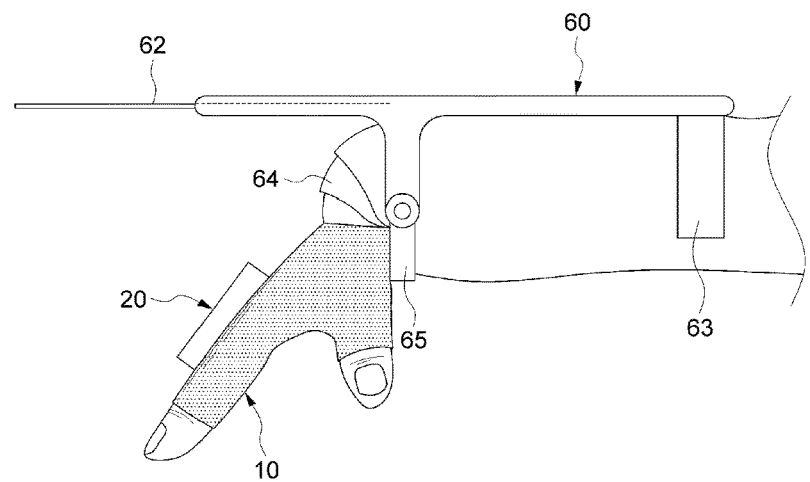

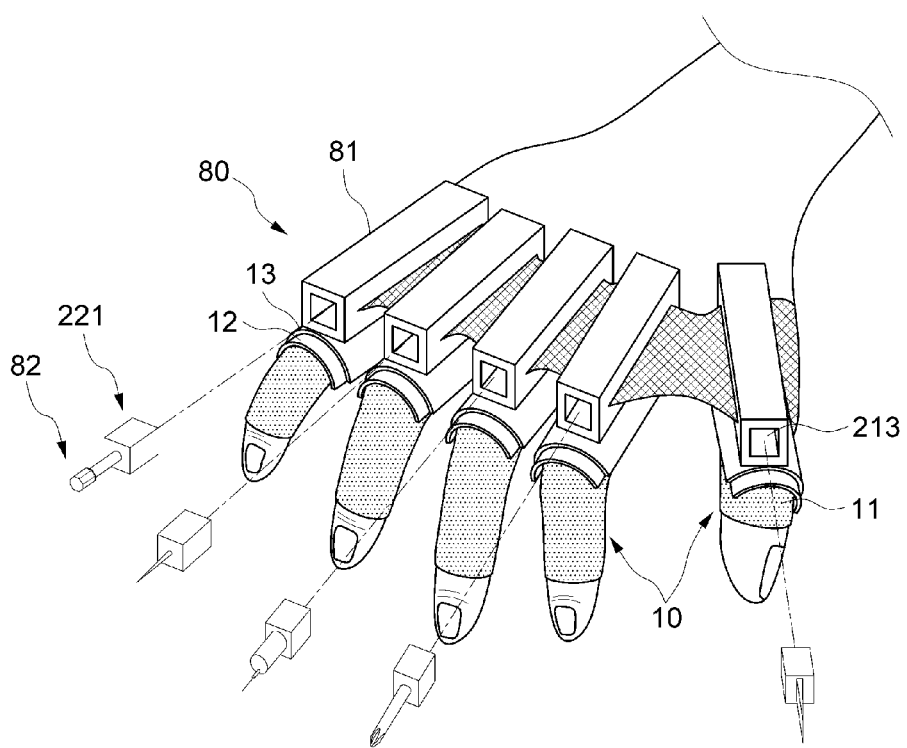
[Fig. 21]

WEARABLE DEVICE

CROSS REFERENCE TO RELATED APPLICATIONS

The present application is a National Stage of International Application No. PCT/KR2014/012188, filed on Dec. 11, 2014, which claims priority to Korean Patent Application No. 10-2013-0154115, filed on Dec. 11, 2013, the entire contents of each of which are being incorporated herein by reference.

FIELD OF THE DISCLOSURE

The present disclosure relates generally to a wearable device, and more particularly to a wearable device that can accommodate a tool usable in the state of being gripped or attached and that enables the tool to enter and exit through the bending and straightening operations of a human, an animal or a mechanical device.

BACKGROUND OF THE DISCLOSURE

People can perform various tasks using various tools. For example, people can perform the task of cutting a predetermined object using a knife or scissors, can perform the task of driving in a nail using a hammer, or can perform the task of fastening a screw using a driver. Such tools may be gripped by or mounted on humans, animals or mechanical devices and then used to perform various types of tasks.

In examples in which such tools are used by people, generally, the tools are mostly used in the state of being held and gripped with the hands of humans or attached to human bodies, and are separately stored in bags or containers when not in use.

Recently, wearable devices that can be worn on human bodies and have various functions, such as smartwatches, smartglasses, etc., have appeared. In line with this tendency, there is a demand for a wearable device that can accommodate at least one of the above-described types of tools that can be gripped or attached and then used and that enables the tool to enter or exit through the simple operations of a user.

PRIOR ART (Patent document 1): Korean Patent No. 10-1300827

SUMMARY

Technical Problem

The present disclosure is intended to provide a wearable device that can accommodate one of all tools usable in the state of being held by a human, an animal or a mechanical device and being gripped or attached and that can discharge the tool to the outside and return the tool to its original location through the simple operations of a human body, an animal or a mechanical device, i.e., a user.

Technical Solution

Although a device according to the present disclosure may be mounted on all joint regions of a user, such as a human, an animal, or a mechanical device, a wearable device according to an embodiment, which is mounted on the body of a human, i.e., the human body, particularly the back of a hand, includes a wearing unit configured to be mounted on the human body, a housing configured to be coupled to the wearing unit and to accommodate a tool having a predetermined function, and a power transmission unit configured such that one end thereof is coupled to a part of the wearing unit and the other end thereof comes into contact with the tool, thereby moving in conjunction with the movement of the human body and transmitting force to the tool; the power transmission unit comprises a string configured such that one end thereof is connected to the wearing unit, a first link configured to be coupled to the other end of the string, a rotation shaft configured to be coupled to the first link and to be installed in the housing so that it can rotate about its axis, and a second link configured such that one end thereof is coupled to the rotation shaft and the other end thereof is coupled to the tool; and when a part of the human body moves, the tool receives force from the power transmission unit and projects out of the housing.

The wearing unit may be mounted on any one of two regions connected by any one joint of human joint, animal joint and mechanical joint, and the housing may be located on a remaining region connected by the joint.

The wearing unit may include finger reception parts surrounding respective fingers, and a mesh made of flexible material, such as cloth, metal or plastic, may be provided between the finger reception parts.

The length of the first link may be shorter than the length of the second link.

The string may have elastic members.

The string may be pulled when all or part of the any one of the two regions connected by the any one joint of the human joint, animal joint and mechanical joint, the first link and the second link may be rotated around the rotation shaft when the string is pulled, and the second link may project the tool out of the housing by applying force to the tool.

An elastic member connected to one side of the tool may be provided on the housing, and the length of the elastic member may be increased when the tool is projected out of the housing.

The tool projected out of the housing may be returned into the housing by restoring force of the elastic member when the all or part of the any one of the two regions connected by the any one joint of the human joint, animal joint and mechanical joint is straightened.

Rollers may be provided on an end of the second link, and the rollers may push the tool while sliding along one side surface of the tool.

A roller guide portion configured to accommodate the rollers and guide the rollers through movement may be provided on one side surface of the tool.

The rollers may push the tool out of the housing while moving in any one direction of the roller guide portion when the all or part of the any one of the two regions connected by the any one joint of the human joint, animal joint and mechanical joint is bent; an elastic member coupled to the second link may be provided on the housing, and the tool may be pulsed and returned into the housing while the rollers are moved in a remaining direction of the roller guide portion by the restoring force of the elastic member when the all or part of the any one of the two regions connected by the any one joint of the human joint, animal joint and mechanical joint is straightened.

The second link may be configured in a curved shape, and may adjust a guiding width while pushing one side of the guide part.

A separate curved third link may be coupled to the rotation shaft of the first link, and may be operated in conjunction with the existing second link, so that the second link pushes the tool and the third link may adjust a guiding width while pushing one side of the guide part.

Another third link may be coupled to an end of the second link, and, when a user bends the fingers by clenching a fist, the first link, the second link and the third link may be simultaneously operated, the rollers mounted on the end of the third link may push the tool, and an output length of the tool may be additionally extended.

The housing may include: guide parts configured to come into contact with the tool and guide the tool through movement; and rails configured to support the guide parts; and the guide parts may be guided through movement by the rails and be moved and adjusted in a direction in which the rails extend.

A cylinder-type device configured to secure the state in which the tool has been mounted on the guide part and provide stable driving and an upper cylinder guide configured to move the cylinder-type device in a direction in which the tool enters and exits may be provided inside on the inside surface of the upper lid of the housing.

The wearable device may further include a slope adjustment unit configured to adjust a slope at which the tool is projected.

The slope adjustment unit may include: a body part fastened to one side of the tool; a manipulation part slidably coupled to the body part; and a connection part configured to connect the manipulation part and the body part and transfer force, applied to the manipulation part, to the body part; a plurality of fastening pins projects from a surface of the body part opposite to the manipulation part, and a plurality of reception grooves configured to receive the fastening pins is formed on a surface of the manipulation part opposite to the body part; and the manipulation part is not rotated when the fastening pins are inserted into the reception grooves, and the manipulation part is rotatable when the manipulation part slides away from the body part and thus the fastening pins are removed from the reception grooves.

The housing further may include: a rotation plate configured to rotate the rails and the guide parts in a horizontal angle direction in order to adjust a horizontal angle at which the tool is projected; and a rotation manipulation part configured to manipulate the driving of the rotation plate.

The second link may be detachably coupled to the rotation shaft.

An additional rotation shaft configured to be rotated in a direction opposite to a rotation direction of the rotation shaft may be provided at an end of the second link, and a third link configured to be rotated around the additional rotation shaft may be coupled to the additional rotation shaft.

A third link bent in a preset direction may be additionally connected to the rotation shaft between the first and second links, a third link roller shaft and third link rollers may be mounted at an end of the third link, the third link rollers may be configured to b connected to outside surfaces of the guide part, and the third link rollers may be configured to be connected to an outside surface of the guide parts, so that an end of the third link adjusts a width between the guide parts by pushing a side surface of the tool guide according to a rotation direction of the rotation shaft and, thus, the guide parts can hold the tool.

The tool may be at least one of all types of grip- or attachment-type tools including at least a knife, scissors, a smartphone, a curved display device, a keyboard, a weapon, and a syringe.

The wearing unit may be mounted on finger joints, a hand or a wrist of a user, the housing may be located on backs of the fingers, a back of the hand or a back of an arm, the power transmission unit may connect the finger joints, hand or wrist to the tool, the tool may be projected out of the housing when the finger joints, hand or wrist are bent, and the tool may be returned into the housing when the finger joints, hand or wrist are straightened.

Related components, such as wearing units, housings, etc., may be formed to have small sizes and be worn and mounted in the form of an array individually or in groups, and different tools may be mounted and used in the housings.

Advantageous Effects

According to the embodiments of the present disclosure, the tool is enabled to enter and exit by the movement and operation of a user, i.e., a human, an animal or a mechanical device, and thus a separate battery or an external power source is not required.

Furthermore, all kinds of grip- or attachment-type devices and tools can be replaced and used in accordance with required functions.

Furthermore, the angle and the direction at and in which the tool is discharged can be adjusted as desired by a user.

Furthermore, a locking function can be used when the tool is not used, and thus a user can be protected from the function of the tool.

Furthermore, the tool is worn on a joint region of the user, and thus the portion on which the tool is worn can be protected from a harmful effect that occurs in the outside.

Moreover, according to the embodiment that is applied to a hand of a human, the tool is mounted on a joint region of the human body of the user and is projected and used in conjunction with the operation and movement of the joint, and thus that a hand, a finger, etc. of a user can additionally grip tools or objects, other than the tool, and can simultaneously and additionally perform the various functions thereof.

BRIEF DESCRIPTION OF THE DRAWINGS

FIG. 1 is a diagram showing a situation where a wearable device according to an embodiment, which is applied to a hand of a human, is worn in the state in which the hand is straightened, among examples that various users apply to a human, an animal, a mechanical device, etc. according to the present disclosure;

FIG. 2 is a diagram showing a situation where a tool has been projected in the state in which the wearable device according to the one embodiment is worn with fingers bent by clenching a fist;

FIG. 3 is a perspective view of the housing of the wearable device according to the one embodiment;

FIG. 4 is a perspective view of a wearable device according to one embodiment;

FIG. 5 is a side view of the wearable device according to the one embodiment;

FIG. 6 is a diagram showing the movement of a tool accommodated in the wearable device according to the one embodiment and components for the guidance of the movement;

FIG. 7 is a diagram showing components for the control of the exit slope of the tool in the wearable device according to the one embodiment;

FIG. 8 is a diagram showing the power transmission unit of the wearable device according to the one embodiment;

FIG. 9a is a perspective view of the tool accommodated in the wearable device according to the one embodiment;

FIG. 9b is an enlarged perspective view of a part of the tool accommodated in the wearable device according to the one embodiment;

FIG. 10 is a diagram showing a method by which the power transmission unit is disassembled in the wearable device according to the one embodiment;

FIG. 11 is a diagram showing an extensible power transmission unit that can simultaneously control the entry and exit of a tool and the width between guides in a wearable device according to one embodiment;

FIG. 12 is a schematic diagram showing a configuration in which the tool enters and exits through a front surface, other than a side surface, within the wearable device or a power transmission unit of the wearable device that controls a location on the rails of tool movement guides in a direction toward the front surface in the one embodiment;

FIG. 13 is a schematic diagram of the power transmission unit of the wearable device in which the tool enters and exits through aside surface in a direction toward a thumb finger in the one embodiment;

FIG. 14 is a diagram showing a situation where the tools of a wearable device have been projected according to an extended embodiment that enables the tools of the embodiments to enter and exit through a front surface and both side surfaces;

FIG. 15 is an exploded perspective view showing a tool mounting unit, including a tool, a tool base and guide parts, and upper guide rails on a lid on top of a housing, which are accommodated in the wearable device according to the one embodiment;

FIG. 16 is a diagram showing the configuration of a coupling and fastening device that may be used in the coupling portions of a tool mounting unit or a housing coupling unit in the wearable device according to the one embodiment;

FIG. 17 is a diagram showing the configuration of a length-extensible power transmission unit for an increase in the distance over which the tool of the wearable device enters or exits, according to the one embodiment;

FIG. 18 is a diagram showing a situation where scissors, i.e., an example of another type of tool, have been projected and the operating principle of the scissors in a wearable device according to one embodiment;

FIG. 19 is a diagram showing a situation where a smartphone, i.e., still another type of tool, has been accommodated in a wearable device according to one embodiment;

FIG. 20 is a side view of a wearable device that is worn on a forearm and uses force generated when a wrist joint moves, which is an extended form of the wearable device according to the one embodiment; and FIG. 21 is a diagram showing an array-type wearable device in which a plurality of wearable devices corresponding to reduced forms of the wearable device according to the embodiment is connected to each other and examples of tools which can be mounted in the respective devices.

DETAILED DESCRIPTION

Specific embodiments of the invention of a wearable device that is worn on a joint region of a human, an animal or a mechanical device and then used will be described in detail with reference to the accompanying drawings based on examples that are applied to a joint region of a human. Accordingly, the described spirit of the present disclosure is not limited to these embodiments, but the spirit of the present disclosure may be proposed or embodied in a form different from a described from through the addition, change or deletion of a component of such an embodiment. These are also included in the spirit of the present disclosure.

FIG. 1 is a diagram showing an example of a situation where an embodiment of a wearable device according to the present disclosure, which may be applied to a hand of a human, is applied to a hand, which shows the state in which a tool remains parked inside a device in a situation where a hand is straightened. FIG. 2 is a diagram showing a situation where, when a fist is clenched in the state in which the wearable device according to the embodiment is worn on a hand, joints between fingers and the back of the hand are bent and, simultaneously, a tool is projected. FIG. 3 is a perspective view of the housing of the wearable device according to the embodiment, which includes a side entrance. Meanwhile, FIG. 4 is a perspective view of a wearable device according to an embodiment, which includes joint body portions and finger reception parts. FIG. 5 is a side view of the wearable device according to the embodiment, which includes the joint body portions, the finger reception parts, and a connected rotation shaft.

Referring to FIGS. 1 to 5, a device 1 according to an embodiment, i.e., an example of wearable devices, includes: a wearing unit 10 configured to be worn on a joint region of a human body; a housing 20 coupled to the wearing unit 10, and configured to accommodate a tool 22 having a predetermined function; and a power transmission unit 30 (see FIG. 8) configured to move in conjunction with the movement of the human body and to transmit force to the tool 22.

The wearing unit 10 may be mounted on any region of a human body. As an example, the wearing unit 10 may be a glove adapted to be worn on a hand, like that of the present embodiment, or may be an extensible glove 10 (see FIG. 20) adapted to be worn on the back of a hand, a wrist, and the back of an arm. The wearing unit 10 is preferably muffled on one of the bendable regions of a human body, i.e., one of all the types of joint regions of a human body.

The wearing unit 10 of the embodiment may include a first finger reception part 11 configured to receive a thumb, and a second finger reception part 12 configured to receive fingers exclusive of the thumb. The finger reception parts 11 and 12 may be formed such that the ends thereof are blocked and thus surround overall fingers, or may be formed such that the ends thereof are open and thus expose parts of nails and fingers.

A mesh 14 having a net shape may be provided between the finger reception parts 11 and 12. The mesh 14 may be made of cloth or metallic material. The mesh 14 may prevent the individual finger reception parts 11 and 12 from being spaced apart from each other, and, at the same time, may enable the individual finger reception parts to operate as a single integrated unit.

Joint parts 13 may be provided between the finger reception parts 11 and 12 and the housing 20. The joint parts 13 may be provided at locations corresponding to joints between the fingers and the back of the hand, and the joint parts 13 may be bent when the fingers are bent. Each of the joint parts 13 may include a plurality of joint body portions 131, 132 and 133. The joint body portions 131, 132 and 133 may include the first joint body portion 131 disposed on the outermost side, the second joint body portion 132 disposed inside the first joint body portion 131, and the third joint body portion 133 disposed inside the second joint body portion 132. The first joint body portion 131 may be formed in a cylindrical shape, and has a diameter larger than that of the second joint body portion 132. The second joint body portion 132 may be formed in a cylindrical shape, and has a diameter larger than that of the third joint body portion 133.

The joint body portions 131, 132 and 133 may be in a superimposed state when the fingers inserted into the finger reception parts 11 and 12 are straightened, and may be extended and form a bent shape when the fingers are bent. That is, the second and third joint body portions 132 and 133 may be accommodated inside the first joint body portion 131 when the fingers inserted into the finger reception parts 11 and 12 are straightened, and the second joint body portion 132 and the third joint body portion 133 may be sequentially moved out of the first joint body portion 131 when the fingers are bent.

The joint body portions 131, 132 and 133 may be rotated around a rotation shaft 135 provided in the wearing unit 10. When the fingers are bent, the third joint body portion 133 disposed on the innermost side is rotated through the largest angle and is moved out of the second joint body portion 132, and the second joint body portion 132 is rotated through an angle smaller than that of the second joint body portion 133 and is moved out of the first joint body portion 131, as shown in FIG. 5. As described above, the second joint body portion 132 and the third joint body portion 133 are rotated around the rotation shaft 135 while being sequentially moved out of the first joint body portion 131, thereby performing movement in response to an operation in which the fingers are bent. In this case, strings 31 (see FIG. 8) are connected to end surfaces of the third joint body portions 133. When the fingers are bent, the strings 31 are pulled and extended, and apply force that pulls a string fastening part 32 (see FIG. 8) toward the direction of the fingers.

The housing 20 may be located on the back of a hand when the wearing unit 10 is mounted on the hand and fingers of a human body. An accommodation space inside which the tool 22 may be accommodated is formed in the housing 20. The housing 20 may include a first housing 21 disposed on the back of the hand, and a second housing 24 disposed on a thumb. Although the second housing 24 has the same function as the first housing 21, it may be considered to be a reduced housing in which an internal tool and all internal parts are configured to be mounted in a smaller accommodation space per se. A mesh 25 having a net shape may be provided between the first housing 21 and the second housing 24. The mesh 25 may be made of a flexible and tough material, such as cloth, plastic or metal.

A cover 211 configured to selectively open and close the first housing 21 may be provided on the top surface of the first housing 21. A user may open the cover 211 and then replace the tool installed inside the first housing 21, and may install a tool 22 (see FIG. 15) inside the first housing 21 and then close the first housing 21 by closing the cover 211.

In the case where the cover 211 and the top surface of the first housing 21 correspond to a glove that is fully surrounded by the wearing unit 10, the back-of-a hand side zipper 212 of the glove may be provided on the wearing unit 10 surrounding the edges of the cover 211 so that mounting is possible therein. In this case, the user may selectively couple the housing 20 and the cover 211 to each other using the zipper 212 as desired. Meanwhile, the cover 211 of the housing 21 includes two guide rails 2111 (see FIG. 15) mounted on the inside of the cover 2111 in parallel. The guide rails 2111 press and fasten the tool 22 when the tool 22 is inserted into and installed in a reception part 226 (see FIG. 15) in the state in which the cover 211 is closed, and support and guide the tool 22 while the tool 22 is entering or exiting while moving between the upper guide rails 2111.

An entrance 213 through which the tool 22 enters and exits is formed through the side surface of the first housing 21. The entrance 213 may be formed to be sufficiently lame so that interference does not occur in the process in which the tool 22 enters and exits. Although the entrance 213 may be formed through the side surface of the first housing 21, as shown in FIG. 3, the location at which the entrance 213 is formed is not limited thereto, but the entrance 213 may be formed through a front surface or another side surface according to the direction in which the tool 22 is discharged.

FIG. 6 is a diagram showing components for the guidance of the tool 22 accommodated inside the housing 20 of the wearable device according to the one embodiment, FIG. 7 is a diagram showing components for the adjustment of the entry and exit slope of the tool in the wearable device according to the one embodiment, FIG. 8 is a diagram showing the power transmission unit of the wearable device according to the one embodiment, FIG. 9a is a perspective view of the tool accommodated in the wearable device according to the one embodiment, FIG. 9b is an enlarged perspective view of a part of the tool, and FIG. 10 is a diagram showing the state in which the power transmission unit is disassembled and the transmission of power is cut off in the wearable device according to the one embodiment.

Referring to FIGS. 6 to 10, first, one end 31 of the power transmission unit 30 may be coupled to the finger reception parts 11 and 12 or the joint body portions 13 or 133, and the other end 36 of the power transmission unit 30 may come into contact with the tool 22, as shown in FIG. 8.

The power transmission unit 30 may include: strings 31 connected to the finger reception parts 11 and 12 or joint body portions 13 or 133; a first link 33 coupled to ends of the strings 31; a rotation shaft 34 coupled to the first link 33 and installed on the housing 20 so that it can rotate about its axis; and a second link 35 configured such that one end thereof is coupled to the rotation shaft 24 and the other end 36 thereof is coupled to the tool 22.

Each of the strings 31 may be formed in the shape of a thin string, and may include an elastic member, such as a coil spring. When the user bends the fingers, the strings 31 may be tightened due to the application of tension, and may pull the first link 33 toward the second finger reception part 12. The strings 31 are preferably maintained in a tightened state to some extent so that they can sensitively respond to the movement of the fingers. Accordingly, it is not preferred that the lengths of the strings 31 are excessively long and thus loosened.

The string fastening part 32 coupled to the strings 31 may be provided at one end of the first link 33. The string fastening part 32 may be formed in a cylindrical shape, and a plurality of strings 31 extending from the second finger reception parts 12 may be fastened to the string fastening part 32.

The first link 33 may be formed in the shape of a rigid bar whose section has a rectangular or circular shape. The string fastening part 32 may be provided at one end of the first link 33, and the other end of the first link 33 may be coupled to the rotation shaft 34. The first link 33 may be installed to be rotated around the rotation shaft 34.

The second link 35 may extend from the rotation shaft 34 in a predetermined direction. The second link 35 forms a preset angle with the first link 33, and an angle formed by the second link 35 and the first link 33 may be adjusted based on the exit distance of the tool 22 and be always kept uniform. As an example, an angle that is formed by the second link 35 and the first link 33 may be 90 degrees.

Furthermore, the second link 35 may be formed to be longer than the first link 33. Accordingly, a trajectory along which the end of the second link 35 in the direction of the roller shaft 36 moves is larger than a trajectory along which the string fastening part 32 of the first link 33 moves in proportion to the difference between the lengths of the trajectories. Even when the strings 31 are slightly pulled, the end of the second link 35 may move greatly and push the tool 22.

The roller shaft 36 may be provided at an end of the second link 35. The roller shaft 36 may be formed in a cylindrical shape, and rollers 361 may be rotatably coupled to both ends of the roller shaft 36. The rollers 361 may be formed in a disk shape having a diameter larger than that of the body of the roller shaft 36 in a cylindrical shape.

The rollers 361 may be fitted into the tool 22, may roll along one side surface, and may push the tool 22.

As illustrated in FIG. 9, roller guide portions 222 configured to accommodate the rollers 361 and guide the rollers 361 through their movement may be provided on the back side surface of the tool 22. The roller guide portions 222 are formed to each have a ⊏-shaped groove into which the roller 361 may be inserted, and the roller 361 may be inserted into the groove and prevented from being separated.

The operation of the power transmission unit 30 is described in brief. First, when a grip operation is performed by bending the finger inserted into the reception part 12, the strings 31 are pulled toward the finger reception part 12. When the strings 31 are pulled, the string fastening part 32 of the first link 33 is pulled toward the finger reception part 12.

When the first link 33 is moved toward the finger reception part 12, the rotation shaft 34 rotates about its axis. When the rotation shaft 34 is rotated, the second link 35 coupled to the rotation shaft 34 is rotated around the rotation shaft 34. In this case, the second link 35 may push the tool 22 while being rotated around the rotation shaft 34, in which case the tool 22 may pass through the housing entrance 213 of the housing 20 and be projected to the outside.

Meanwhile, an elastic member 29 configured to restore the tool 22, projected out of the housing 20, to its original location is provided on one side of the tool 22. One end of the elastic member 29 may be coupled to the tool 22, and the other end of the elastic member 29 may be coupled to the internal circumferential surface of the housing 20. The elastic member 29 may be provided on the internal circumferential surface opposite to the entrance 213, and may be, for example, a coil spring.

Since the elastic member 29 is pulled while the tool 22 is being projected out of the housing 20, the length of the elastic member 29 is increased. When the fingers inserted into the finger reception parts 11 and 12 are straightened, the length of the elastic member 29 decreases due to the restoring force of the elastic member 29 and returns the tool 22 to the inside of the housing 20. In greater detail, when the bent fingers are straightened, tension applied to the strings 31 is reduced and does not pull the first link 33 any longer, and the rollers 361 enter the state of not supporting the tool 22 any longer. In this state, the elastic member 29 connected to the tool 22 pulls the tool 22 as the length of the elastic member 29 decreases due to the restoring force of the elastic member 29.

When the tool 22 is returned to the inside of the housing 20, the rollers 361 roll in a direction opposite to the direction of the rolling of the rollers 361 when the rollers 361 push the tool 22, and the second link 35 and the first link 33 are rotated also in direction opposite to the direction of the rotation f the second link 35 and the first link 33 when the tool 22 is projected.

As illustrated in FIG. 6, the housing 20 may include guide parts 27 configured to come into contact with the tool 22 and guide the tool 22 through its movement, and rails 28 configured to support the guide part 27. The guide parts 27 are provided on both sides of the tool 22, and extend in parallel in the state of being spaced apart from each other at a predetermined interval. The length of the guide parts 27 may extend in a direction identical to a direction in which the tool 22 extends. A guide groove 271 into which a part of the tool 22 can be inserted may be formed in each of the guide parts 27. The guide groove 271 may extend in a direction identical to the direction in which the tool 22 extends, and may prevent the tool 22 from being separated and support both sides of the tool 22.

The rails 28 may be installed through the bottoms of the guide parts 27, and may guides the guide parts 27 through their movement. The rails 28 extend in parallel in the state of being spaced apart from each other at a predetermined interval. The guide parts 27 may be moved on the rails 28, and the distance between the guide parts 27 may be adjusted. Accordingly, although the tool 22 is replaced with a larger tool, the distance between the guide parts 27 may be increased and the larger tool may be accommodated between the guide parts 27.

The rails 28 may extend in the direction in which the rails 28 intersect the guide parts 27. As an example, the rails 28 may extend in the direction in which the rails 28 intersect the guide parts 27 at a right angle. Accordingly, when the guide parts 27 are moved on the rails 28 in a horizontal direction, the location at which the tool 22 is projected may be moved in the horizontal direction.

Meanwhile, the tool 22 may be provided with a tool base 221. The tool base 221 may be formed in a rectangular shape, and may support the actual predetermined function part of one of all tools including a knife, a blade, a screw driver, a gimlet, a syringe, etc. A roller guide portion 222 may be provided on the back surface of the tool base 221, and projected portions 223 configured to be inserted into the guide grooves 271 may be formed on both side surfaces of the tool base 221. Each of the projected portions 223 include upper insertion portion 2232 configured to be inserted into the upper portion of the guide groove 271 and a lower insertion portion 2231 configured to be inserted into the lower portion of the guide groove 271. The upper insertion portion 2232 and the lower insertion portion 2231 may be inserted into the guide groove 271, and may prevent separation when the tool base 221 moves along the guide groove 271.

As illustrated in FIG. 7, the tool base 221 or guide part 27 may be provided with a slope adjustment unit 26 configured to adjust the entry and exit slope of the tool 22. The slope adjustment unit 26 may include a body part 263 configured to be fastened to one side of the tool base 221 or guide part 27, a manipulation part 262 slidably coupled to the body part 263, and a connection part 265 configured to connect the manipulation part 262 and the body part 263 and transfer force, applied to the manipulation part 262, to the body part 263. The connection part 265 may be connected to a cylindrical elevation adjustment cylinder (not shown) having a elliptical section inside the tool base 221, and the elevation adjustment cylinder (not shown) increases or decreases an elevation angle, i.e., an entry and exit angle, from the internal lower end surface of the housing 20 of the tool base 221 when the connection part 265 is rotated.

A plurality f fastening pins 264 projects from the surface of the connection part 265 coupled to the manipulation part 262, and a plurality of reception grooves (not shown) into which the fastening pins 264 arranged on the surface of the connection part opposite to the inner surface of the body part 263 are inserted may b formed. When the fastening pins 264 are inserted into the reception grooves (not shown), the manipulation part 262 is not rotated due to the interference between the fastening pins 264 and the reception grooves (not shown). Accordingly, the entry and exit slope of the tool 22 is prevented from being changed when the user rotates the manipulation part 262 due to his or her unintended mistake.

In order to adjust the slope at which the tool 22 enters or exits, the user may remove the manipulation part 262 from the body part 263 through pulling. When the manipulation part 262 slides and becomes away from the body part 263 mid thus the fastening pins 264 are removed from the reception grooves, the manipulation part 262, the connection part 265 and the elevation adjustment cylinder (not shown) becomes rotatable. When the manipulation part 262 becomes rotatable, the user may adjust the slope at which the tool 22 enters into and exits from the housing 20 by rotating the grip 261 provided on the manipulation part 262. In this case, the elastic member 266 that connects the body part 263 with the manipulation part 262 and the grip 261 is in an extended state. When the grip is released after the elevation has been adjusted, the manipulation part 262 is returned to its original location by restoring force. Accordingly, the fastening pins 264 are engaged with reception grooves (not shown the inner side surface of the body part 263, fix the angle of an angle adjustment cylinder (not shown), and prevent the angle from changing.

Furthermore, the housing 20 may include a rotation plate (not shown) configured to rotate the rails 28 and the guide parts 27 in a horizontal angle direction to adjust a horizontal angle at which the tool 22 is discharged, and a rotation manipulation part (not shown) configured to manipulate the driving of the rotation plate. The user may set whether the rotation plate is rotated and the angle at which the rotation plate is rotated by manipulating the rotation manipulation part. In this case, although a method for adjusting the rotation of the rotation plate (not shown) is the same as the principle of the slope adjustment unit 26, a difference resides only in that the elevation adjustment cylinder (not shown) is replaced with the rotation plate and the rotation plate is operated during operation.

Furthermore, as shown in FIG. 10, when the use of the tool 22 is temporarily stopped, the second link 35 may be separated from the rotation shaft 34. For this purpose, the second link 35 may be provided with a rotation shaft coupling portion 351 that is coupled to the rotation shaft 34, and projected portions 341 and 352 for coupling may be formed on the rotation shaft 34 and the rotation shaft coupling portion, respectively.

A separation bar 37 may be coupled to the rotation shaft coupling portion 351, and a manipulation part 38 configured to manipulate the separation bar 37 may be provided at an end of the separation bar 37. The manipulation part 38 may project outside of the housing 20 so that the user can manipulate the manipulation part 38.

In order to temporarily stop the use of the tool 22, the manipulation part 38 may be pulled. When the manipulation part 38 is pulled, the rotation shaft coupling portion 351 may be removed from the projected portion 341 of the rotation shaft 34.

Alternatively, threads may be formed on the separation bar 37. A configuration may be made such that, when a female screw is formed on the rotation shaft coupling portion 351 or the projected portion 341 of the rotation shaft 34 and the manipulation part 38 is rotated, the rotation shaft coupling portion 351 may be removed from the projected portion 341 of the rotation shaft 34. When the projected portion 352 of the rotation shaft coupling portion 351 is removed from the projected portion 341, the projected portion 352 remains in an area within a range set and limited by a rotation shaft coupling portion guide 353 that is arranged on the lower end surface of the housing 20 in parallel. When the manipulation part 38 is manipulated in a reverse manner, the rotation shaft coupling portion 351 moves toward the rotation shaft 34 along the coupling portion guide 353, and the projected portion 352 and the projected portion 341 are coupled to each other. Accordingly, the rotation shaft 34 and the second link 35 are engaged with each other, and thus power may be transmitted.

FIG. 11 is a diagram illustrating the power transmission unit of a wearable device according to an embodiment of an extended power transmission unit 70, including two or three links, which is configured by extending the basic power transmission unit 30 of FIG. 8.

Referring to FIG. 11 the extensible power transmission unit 70 is configured to increase the height of the rotation shaft 34 of the previous power transmission unit 30, and a third link 45 bent in a preset direction is additionally connected. A third link roller shaft 46 and third link rollers 461 are mounted at an end of the third link 45. The third link rollers 461 are configured to be coupled to the outside surfaces of the guide part 27. In the embodiment, when a user clench his or her fist or bend his or her fingers, the previous power transmission unit 30 discharges a tool in the above-described manner. Additionally, the rollers 461 of the third link 45 function to push the outside surfaces of the guide parts 27 in the direction in which the tool is discharged due to the bent shape, and this function reduces the widths of the guide parts 27. Accordingly, the guide parts 27 may more strongly hold the tool base 221, and also all types of tool bases are enabled to be mounted and used by a single type of guide parts 27 even when a plurality of tool bases 221 having different widths is selectively used.

Meanwhile, referring to FIG. 12, there is shown a schematic diagram in which the previous second link 35 and related auxiliary parts 36 and 361 have been eliminated and have been replaced with the third link 45 and related auxiliary parts 46 and 461 at corresponding locations. In the wearable device 1 according to this embodiment, the tool 22 is not discharged from a side surface of the housing 20, but may be discharged in front of the finger direction of the housing 20. That is, the previous power transmission device 30 including the first link 33 and the second link 35 may discharge the tool 22 in a direction across the outside surface of a little finger, and the direct connection combination of the first link 33 and the bent third link 45 may discharge the tool 22 in the direction of the nails of fingers, i.e., in a direction across the front surface of a fist. Furthermore, when the first link 33, the second link 35 and the third link 45 are all coupled to one another, the entry and exit of the tool in a direction across the front surface of the fist and the adjustment of the width between the guide portions 27 holding various types of tool bases may be achieved through a simple operation of clenching a fist or bending fingers.

FIG. 13 is a diagram schematically showing the power session unit 30 of a wearable device according to an embodiment of the case where the tool entrance 213 of the housing 20 is located through a side surface on a thumb side (i.e., a left side). In the wearable device 1 according to this embodiment, the tool 22 may be discharged through the left surface of the housing 20, rather than being discharged through the right surface of the housing 20 as in the above-described embodiment.

In order to discharge the tool 22 through the left surface of the housing 20, the direction in which the first link 33 and second link 35 of the power transmission unit 30 are rotated around the rotation shaft 34 may be set to a direction that is opposite to that of the above-described embodiment. In greater detail, in FIG. 8, the first link 33 and the second link 35 are rotated around the rotation shaft 34 in a counter-clockwise direction, thereby discharging the tool 22 through the right surface of the housing 20, i.e., the outer side of a hand. In contrast, in FIG. 13, the first link 33 and the second link 35 are rotated around the rotation shaft 34 in a clockwise direction, thereby discharging the tool 22 through the left surface of the housing 20, i.e., the inner side of a hand. In this case, a tool restoration elastic member 29 is connected to an inside surface opposite to the tool entrance 213 and also to the tool 22 and the tool base within the housing.

Another arrangement method for a power transmission unit 30 configured to discharge the tool 22 through an entrance 213 on a side of a thumb (i.e., a left side) is as follows. When the rotation shaft 34 of the power transmission unit 30 is located closer to an inner wall on the little finger (i.e., right) side of the housing 20 and strings 31 are connected to the thumb housing 24 or thumb wearing unit 11, power is transmitted to the tool base 221 via the first link 33, the rotation shaft 34 and the second link 35 upon occurrence of a thumb bending operation, thereby enabling the tool to be discharged through the thumb direction entrance.

FIG. 14 is a diagram showing the state in which a plurality of tools simultaneously projects through the front, left and right surfaces of a housing in a wearable device based on the extended application of the above-described embodiments. Referring to FIG. 14, the wearable device according to the present embodiment may be configured such that the above-described three embodiments (see FIGS. 2, 12, and 13) are applied to a single housing 20, so that, when fingers are bent, tools 22 simultaneously project through the front, left and right sides of the housing 20 in three directions. In this embodiment, the tools 22 in the housing 20 may include a first tool 22a configured to be discharged through the left surface of the housing 20, a second tool 22b configured to be discharged through the front surface f the housing 20, and a third tool 22c configured to be discharged through the right surface of the housing 20.

FIG. 15 is an exploded perspective view of the tool 22 and the guide part 27 accommodated in the wearable device 1 according to the above-described one embodiment, which includes a technology related to a method for replacing the tool 22 with the housing 20. FIG. 16 is a diagram showing the configuration of the coupling portions of blade cases 2211 and 2212 in the wearable device according to the one embodiment.

Referring to FIGS. 15 and 16, the tool 22 includes the actual predetermined function part of one of all types of grip-type tools, including a knife, a blade, a screw driver, a gimlet, a syringe, etc., and a tool base 221 configured to support the actual predetermined function part. The tool base 221 may include a lower case 2211, an uppercase 2212 configured to be coupled to the top of the lower case 2211, and a case support part 225 configured to be coupled to the lower case 2211 and the upper case 2212 and to be fitted into the guide parts 27. The case support part 225 includes a roller guide portion 222.

The lower case 2211 and the upper case 2212 may be formed in a rectangular shape, and may be fastened to each other using various methods. As an example, as illustrated in FIG. 16, a hook 2214 may be rotatably provided on the upper case 221 and a hook holder 2215 on which the hook 2214 may be caught may project from the lower case 2211. A hook manipulation part 2211 configured to manipulate the hook 2214 may be provided on the outside of the upper case 2212. In another fastening method, a latch 2216 may be rotatably provided on the upper case 2212, and a latch holder 2217 on which an end of the latch 2216 may be caught may be provided on the lower case 2211. The end of the latch 2216 may be formed to be slightly bent. The latch 2216 is caught in the latch holder 2217, thereby fastening the lower case 2211 and the upper case 2212 to each other.

A reception part 226 configured to be inserted into the lower case 2211 and the upper case 2212 may project from the case support part 225, and through holes 2211a and 2212a through which the reception part 226 can be passed may be formed through the lower case 2211 and the upper case 2212, respectively. The lower case mounting hole 2211a is fitted on the reception part 226, the upper case projected portion 2212a is fitted on the reception part 226 downward, and a fastening device illustrated in FIG. 16a or 16b is applied, thereby simply completing the fastening of the tool inside the housing 20. According to this tool mounting concept, a housing upper lid 21 is configured to be separate from the upper case 2212.

In an embodiment slightly different from the above embodiment, a configuration may be made such that the upper case 2212 may be mounted on the housing upper lid 21, in which case an upper lid guide 211 arranged in parallel with the inside surface of the upper lid 21 is arranged, thereby enabling the upper case 2212 to move forward and backward in the direction in which the tool is discharged. In this case, when the housing lid 21 is closed and fastening is performed, the upper case projected portion 2212a is passed through the lowercase mounting hole 2211a and is inserted into and mounted in the lower case reception part 226. In this case, the fastening device of FIG. 16 performs the function of the fastening device between the upper lid 21 of the housing 20 and the lower body of the housing 20 according to the above-described method.

FIG. 17 is a diagram showing an extended form of the basic power transmission unit 30 illustrated in FIG. 8, which shows the power transmission unit of a wearable device according to an embodiment that is capable of significantly increasing the range within which a tool is discharged, i.e., the length to which the tool is discharged. Referring to FIG. 17, in order to further increase the distance to which the tool 22 is discharged in the power transmission unit 30 shown in FIG. 8, i.e., in order to increase the gain of output/input in the power transmission unit 30, another link 40 may be coupled to a roller shaft 36.

An additional rotation shaft 39 that is automatically rotated around the roller shaft 36 in the direction opposite to the rotation direction of the rotation shaft 34 when the second link 35 is rotated around the rotation shaft 34 is coupled. The third link 40 is coupled to the additional rotation shaft 39, and a second roller shaft 41 is provided at an end of the third link 40.

When the rotation shaft 34 is rotated, the rotation movement of the rotation shaft 36 is transferred to the rotation shaft 39 via a cross-shaped insert 39a. Through this operation, the additional rotation shaft 39 is rotated in the direction opposite to the rotation direction of the rotation shaft 34, and the third link 40 proceeds in a direction identical to the direction in which the second link 35 proceeds. Accordingly, the tool 22 may be moved as the third link end roller 41 further proceeds by the length of the third link 40.

FIG. 18 is a diagram showing the state in which a tool projects in a wearable device according to an embodiment in which all the operations of the configurations described so far are used and a different tool is adopted. Referring to FIG. 18, in the present embodiment, a tool accommodated in a housing 20 is scissors 50. According to a principle identical to the principle of the embodiments and the power transmission devices 30 described so far. When fingers are bent in the direction in which a fist is clenched, the scissors 50 may be discharged out of the housing 20.

The scissors 50 include two scissor blades 51 and 52. An end of any one scissor blade 52 of the scissor blades 51 and 52 may be connected to a finger reception part 11 surrounding a thumb with a string 55, and the end of the scissor blade 52 may be also connected to an internal circumferential surface of the housing 20 with an elastic member 56 located opposite the string 55. The other scissor blade may be fastened to a tool base 221.

Accordingly, when the thumb is moved in the direction in which the fist is clenched in the state in which the scissors 50 have been discharged, the string 55 may pull the scissor blade 52, and thus a cutting operation may be performed. When the string 55 is released by moving the thumb in the direction in which the fist is unclenched, the scissor blade 52 may be returned to its original location by the restoring force of the extended elastic member 56. It will be apparent that when the fist is unclenched and bent fingers are straightened, the scissors 50 are returned to the inside of the housing 20.

FIG. 19 is a diagram showing the state in which a smartphone has been accommodated in a wearable device according to another embodiment for the purpose of using a device, such as a flat or curved display smartphone including an information display among electronic devices, as an example of various available tools. Referring to FIG. 19, a smartphone S having a flat or curved display is configured to enter and exit using all component parts including a tool base 221 and the above-described power transmission device 30. When fingers are bent in the direction in which a fist is clenched, the smartphone S may be discharged out of the housing 20 via the above-described mechanism of the power transmission unit 30. Furthermore, when the bent fingers are straightened, the smartphone S may be returned to the inside of the housing 20.

In an extended embodiment, a keyboard, a tool, a weapon or the like, other than the smartphone S, may be accommodated. FIG. 20 is a side view of a wearable device according to another embodiment in which one of all tools having volumes larger than that of a tool suitable for the back of a hand is mounted. Referring to FIG. 20, the wearing units 63, 64 and 65 of the wearable device according to the present embodiment are mounted on an arm, and a housing 60 configured to accommodate a tool 62 may be located on the back of the arm or the like. The power transmission unit 30 may associate the movement of a hand with the tool 62. When a wrist is bent, the tool 62 projects out of the housing 60. In contrast, when the wrist is straightened, the tool 62 may enter into the inside of the housing 60.

While the relatively small tool 22 is accommodated and used in the above-described housing 20 that is mounted on a hand, one of all types of grip- or attachment-type tools 62 having relatively large volumes and lengths, such as a keyboard, a dagger, a hand shovel, and a short spear, may be accommodated and used in the housing 60 of the wearable device according to the present embodiment. Meanwhile, as shown in FIG. 21, the housing 20 mounted on a hand may be configured in the form of a smaller housing array 80, and different tools may be configured to be mounted in the respective housing units 81 of the array and, thus, the tools 82 inside the respective housing units enter and exit in response to the bending movement of respective fingers. That is, a synergy effect may be achieved using the composite arrangement of the above housings 20, 60 and 80 and, furthermore, using the individual small-sized tools mounted in the housings 20 mountable on a hand or array-type housings 80 mountable on a hand and the tools having large volumes and lengths muffled in the housings 60 mountable on an arm together.

DESCRIPTION OF REFERENCE NUMERALS
OF THE DRAWINGS

1: wearable device
10: wearing unit
11, 12: finger reception part
13: joint region
14, 25: mesh
20: housing
21: first housing
22: tool
24: second housing
26: slope adjustment unit
27: guide part
28: rail
29: elastic member
30: power transmission unit
31: string
32: string fastening part
33: first link
34: rotation shaft
35: second link
36: roller shaft
37: separation bar
38: manipulation part
45: third link
46: third link roller shaft
50: scissors
51 and 52: scissor blade
55: string
56: elastic member
60: large-sized housing
70: extended power transmission unit
80: array-type housing
131, 132 and 133: joint body portion
211: cover
212: zipper
213: entrance
221: tool base
222: roller guide portion
223: projected portion
226: reception part
261: grip
262: manipulation part
263: body part
264: fastening pin
265: connection part
266: elastic member
271: guide groove
341: projected portion
351: rotation shaft coupling portion
352: projected portion
353: coupling portion guide
361: roller
381: third link roller
461: third link roller
2211: lower case
2211a: lower case mounting hole -continued 2212: upper case
2214: hook
2215: holder
2216: latch
2232: upper insertion portion
2231: lower insertion portion

What is claimed is:

1. A wearable device comprising:
a wearing unit configured to be mounted on any one of a human, an animal, and a mechanical device;
a housing configured to be coupled to the wearing unit and to accommodate a tool having a predetermined function; and
a power transmission unit configured such that one end thereof is coupled to a part of the wearing unit and the other end thereof comes into contact with the tool, thereby moving in conjunction with movement of the human, animal or mechanical device and transmitting force to the tool,
wherein the power transmission unit comprises:
at least one string configured such that one end thereof is connected to the wearing unit,
a first link configured to be coupled to the other end of the string,
a rotation shaft configured to be coupled to the first link and to be installed in the housing so that it can rotate about its axis, and
a second link configured such that one end thereof is coupled to the rotation shaft and the other end thereof is coupled to the tool,
wherein the first and second link are configured to rotate about the rotation shaft,
wherein when a part of the human, animal, or mechanical device moves, the tool receives force from the power transmission unit and projects out of the housing, and
wherein rollers are provided on the other end of the second link, and the rollers are configured to be accommodated in a roller guide portion of the tool provided on one side surface of the tool such that the rollers slide along the one side surface of the tool to push the tool.

2. The wearable device of claim 1, wherein the wearing unit is mounted on any one of two regions connected by any one joint of human joint, animal joint and mechanical joint, and the housing is located on a remaining region connected by the joint.

3. The wearable device of claim 2, wherein the wearing unit comprises finger reception parts surrounding respective fingers, and a mesh made of cloth or metal is provided between the finger reception parts.

4. The wearable device of claim 1, wherein the length of the first link is shorter than the length of the second link.

5. The wearable device of claim 1, wherein the at least one string has an elastic member.

6. The wearable device of claim 2, wherein when all or part of the any one of the two regions connected by the any one joint of the human joint, animal joint and mechanical joint is bent the at least one string is pulled, and when the at least one string is pulled the first link and the second link rotate around the rotation shaft, and the second link applies force to the tool to project the tool out of the housing.

7. The wearable device of claim 6, wherein an elastic member connected to one side of the tool is provided on the housing, and the length of the elastic member is increased when the tool is projected out of the housing.

8. The wearable device of claim 7, wherein when the all or part of the any one of the two regions connected by the any one joint of the human joint, animal joint and mechanical joint is straightened, the tool projected out of the housing is returned into the housing by restoring force of the elastic member.

9. The wearable device of claim 1, wherein when the all or part of the any one of the two regions connected by the any one joint of the human joint, animal joint and mechanical joint is bent, the rollers move in any one direction of the roller guide portion and push the tool outside the housing;
and wherein an elastic member coupled to the second link is provided on the housing, and when the all or part of the any one of the two regions connected by the any one joint of the human joint, animal joint and mechanical joint is straightened, the rollers are moved in a remaining direction of the roller guide portion by restoring force of the elastic member and the tool is pulled to be returned into the housing.

10. The wearable device of claim 1, wherein the housing comprises:
guide parts configured to come into contact with the tool and guide the tool's movement; and
rails configured to support the guide parts;
and wherein the guide parts are guided through movement by the rails and are moved in a direction in which the rails extend.

11. The wearable device of claim 10, further comprising a slope adjustment unit configured to adjust the slope at which the tool is projected.

12. The wearable device of claim 11, wherein the slope adjustment unit comprises:
a body part fastened to one side of the tool;
a manipulation part slidably coupled to the body part; and
a connection part configured to connect the manipulation part and the body part and transfer force which is applied to the manipulation part to the body part;
wherein a plurality of fastening pins projects from a surface of the body part opposite to the manipulation part, and a plurality of reception grooves configured to receive the fastening pins are formed on a surface of the manipulation part opposite to the body part;
and wherein when the fastening pins are inserted into the reception grooves the manipulation part is not rotated, and when the manipulation part slides away from the body part and thus the fastening pins are removed from the reception grooves the manipulation part is rotatable.

13. The wearable device of claim 1, wherein the second link is detachably coupled to the rotation shaft.

14. The wearable device of claim 1, wherein an additional rotation shaft configured to be rotated in a direction opposite to a rotation direction of the rotation shaft is provided at an end of the second link, and a third link configured to be rotated around the additional rotation shaft is coupled to the additional rotation shaft.

15. The wearable device of claim 1, wherein a third link bent in a preset direction is additionally connected to the rotation shaft between the first and second links, a third link roller shaft and third link rollers are mounted at an end of the third link, the third link rollers are configured to be connected to outside surfaces of the guide part, and the third link rollers are configured to be connected to an outside surface of the guide parts, so that an end of the third link adjusts the width between the guide parts by pushing a side surface of the tool guide according to rotation direction of the rotation shaft and thus the guide parts can hold the tool.

16. The wearable device of claim 1, wherein the tool is at least one of all types of grip- or attachment-type tools including at least a knife, scissors, a smartphone, a curved display device, a keyboard, a weapon, and a syringe.

17. The wearable device of claim 1, wherein the wearing unit is mounted on finger joints, a hand or a wrist of a user, the housing is located on backs of the fingers, a back of the hand or a back of an arm, the power transmission unit connects the finger joints, hand or wrist to the tool, the tool is projected out of the housing when the finger joints, hand or wrist are bent, and the tool is returned into the housing when the finger joints, hand or wrist are straightened.

18. The wearable device of claim 1, wherein the housing is an array-type housing in which a plurality of small housings is connected to each other, and tools are mounted inside the respective small housings included in the housing and are selectively usable according to selection of movement of a user.

* * * * *